United States Patent [19]

Imai et al.

[11] Patent Number: 4,829,822
[45] Date of Patent: May 16, 1989

[54] SEMICONDUCTOR ACCELEROMETER

[75] Inventors: Masahito Imai, Kariya; Toshitaka Yamada, Nagoya; Tiaki Mizuno, Toyota; Hirohito Shioya, Anjo, all of Japan

[73] Assignee: Nippondenso Co., Ltd., Kariya, Japan

[21] Appl. No.: 98,050

[22] Filed: Sep. 17, 1987

[30] Foreign Application Priority Data

| Sep. 22, 1986 | [JP] | Japan | 61-224122 |
| Sep. 23, 1986 | [JP] | Japan | 61-225437 |
| Sep. 30, 1986 | [JP] | Japan | 61-232223 |
| Nov. 4, 1986 | [JP] | Japan | 61-262557 |
| Nov. 21, 1986 | [JP] | Japan | 61-277991 |
| Aug. 30, 1987 | [JP] | Japan | 62-217718 |

[51] Int. Cl.$^4$ ............................. G01P 15/12
[52] U.S. Cl. .................. 73/516 R; 73/517 R; 73/651; 338/5
[58] Field of Search ............... 73/517 R, 651, 516 R; 338/2, 5, 46

[56] References Cited

U.S. PATENT DOCUMENTS

| 3,089,343 | 5/1963 | Rule | 73/516 R |
| 3,557,628 | 1/1971 | Tsukada | 73/516 R |
| 3,884,085 | 5/1975 | Beckman et al. | 73/517 R |
| 4,164,263 | 8/1979 | Heintz et al. | 73/517 R |
| 4,275,586 | 6/1981 | Gast et al. | 73/651 |

FOREIGN PATENT DOCUMENTS

| 2835999 | 3/1980 | Fed. Rep. of Germany . |
| 45-23315 | 8/1970 | Japan . |
| 50-15669 | 6/1975 | Japan . |
| 59-158566 | 9/1984 | Japan . |
| 60-56314 | 12/1985 | Japan . |
| 61-144576 | 7/1986 | Japan .................. 73/517 R |

OTHER PUBLICATIONS

"A Batch-Fabricated Silicon Accelerometer" by Lynn Michelle Roylance et al., IEEE Transactions on Electron Devices, vol. ED-26, No. 12, Dec. 1979, pp. 1911-1917.

Primary Examiner—John Chapman
Attorney, Agent, or Firm—Cushman, Darby & Cushman

[57] ABSTRACT

A semiconductor accelerometer includes a package containing damping liquid. A base is fixedly disposed within the package. A semiconductor plate is disposed within the package and is supported on the base. The semiconductor plate has a movable free end and a deformable diaphragm. A semiconductor strain gauge is associated with the diaphragm and deforms in accordance with deformation of the diaphragm. The base has a first surface opposing the semiconductor plate free end. The first surface of the base has a recess for limiting movement of the semiconductor plate free end. The recess extends to and opens at a second surface of the base which differs from the first surface.

6 Claims, 10 Drawing Sheets

---THEORETICAL
○,△ EXPERIMENTAL

SEMICONDUCTOR ACCELEROMETER

BACKGROUND OF THE INVENTION

1. Field of the Invention

This invention relates to an accelerometer using a semiconductor.

2. Description of the Prior Art

IEEE Transactions On Electron Devices, Pages 1911–1917, Vol. ED-26, No. 12, December 1979 discloses a batch-fabricated silicon accelerometer which has been developed using silicon IC technology. This semiconductor accelerometer has a silicon cantilevered beam and mass structure sealed into a silicon and glass package. The beam resistor changes its value with acceleration due to the stress induced in the beam. The package includes top and bottom glass covers. A well etched into each glass cover allows the beam to deflect freely up to a given distance. This document also discloses the following fact. Damping the beam resonance by adding a suitable fluid to the accelerometer cavity is a very attractive approach to minimize the impact of the resonance and increase the useful bandwidth.

Japanese published examined patent application 45-23315 discloses an accelerometer having a casing and a vibratory element disposed within the casing. The casing is charged with damping oil so that the vibratory element is immersed in the damping oil. The vibratory element includes a cantilever and semiconductor strain gauges bonded to the cantilever.

SUMMARY OF THE INVENTION

It is a first object of this invention to provide a durable semiconductor accelerometer.

It is a second object of this invention to provide a semiconductor accelerometer having desirable frequency characteristics.

It is a third object of this invention to provide an accurate semiconductor accelerometer.

In accordance with a first aspect of this invention, a semiconductor accelerometer includes a package containing damping liquid. A base is fixedly disposed within the package. A semiconductor plate is disposed within the package and is supported on the base. The semiconductor plate has a movable free end and a deformable diaphragm. A semiconductor strain gauge is associated with the diaphragm and deforms in accordance with deformation of the diaphragm. The base has a first surface opposing the semiconductor plate free end. The first surface of the base has a recess for limiting movement of the semiconductor plate free end. The recess extends to and opens at a second surface of the base which differs from the first surface.

In accordance with a second aspect of this invention, a semiconductor accelerometer includes a package containing damping liquid. A base is fixedly disposed within the package. A cantilever disposed within the package is supported on the base. The cantilever has a movable free end and a deformable diaphragm. A semiconductor strain gauge is associated wit the diaphragm and deforms in accordance with deformation of the diaphragm. A wall disposed within the package is spaced from the cantilever free end by a predetermined distance to allow displacement of the cantilever free end in a range corresponding to the predetermined distance. The predetermined distance is equal to or greater than a value h given by the following equation.

$$h = d \times K fc / (fc0 - fc)$$

where the character dx denotes a displacement of the cantilever free end with respect to an acceleration of 1 G; the character fc denotes a desired cut-off frequency; the character fc0 denotes a cut-off frequency in a free area in the damping liquid without the wall; and the character K denotes a constant.

In accordance with a third aspect of this invention, an accelerometer includes a cantilever moving in accordance with an applied acceleration. The cantilever is immersed in damping liquid. A strain gauge moves with the cantilever. A member has a recess into which the cantilever is movable. A structure allows the damping liquid to essentially freely escape from the recess when the cantilever moves into the recess.

DESCRIPTION OF THE FIRST PREFERRED EMBODIMENT

Figure 1:
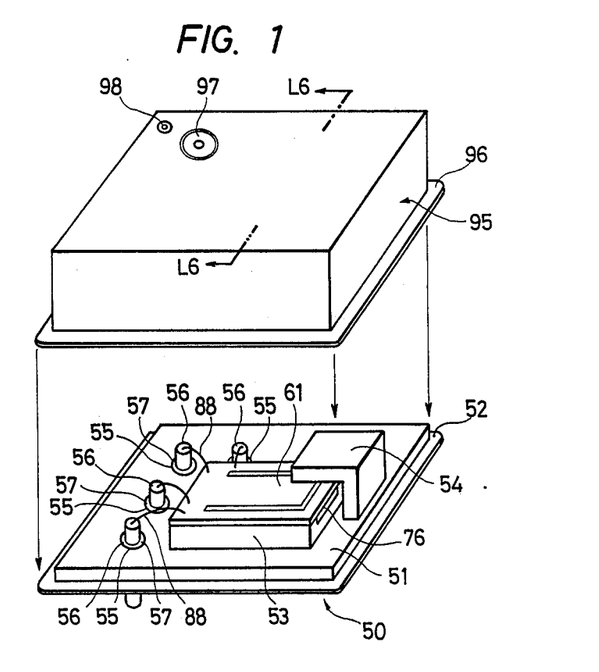
FIG. 1 is perspective view of a semiconductor accelerometer according to a first embodiment of this invention where a package is disassembled to show an internal structure.

FIG. 1 shows a semiconductor accelerometer according to a first embodiment of this invention. It should be noted that in FIG. 1, a package is disassembled to show an internal structure thereof. As shown in FIG. 1, the semiconductor accelerometer includes a stem or lower package member 50 made of metal such as Kovar. The stem 50 has a raised portion 51 surrounded by lowered edges 52. The stem 50 is formed by a suitable process such as a pressing process. For example, during fabrication of the stem 50, edges of a plate-shaped material are pressed into lowered edges 52 and simultaneously a raised portion 51 is formed on the material A base 53 and a stopper 54 are fixedly mounted on the raised portion 51. For example, the base 53 and the stopper 54 are soldered to the raised portion 51. Four holes 55 extend through walls of the raised portion 51. Terminals 56 extend through the respective holes 55. The terminals 56 are fixed to the walls of the raised portion 51 by hard glasses 57 in the holes 55. The hard glasses 57 surround the respective terminals 56 so that the terminals 56 are electrically insulated from the walls of the raised portion 51. The hard glasses 57 are hermetically extend between the terminals 56 and the walls of the raised portion 51.

An acceleration sensor element 60 includes a cantilever 61 supported on the base 53. The cantilever 61 is composed of a semiconductor plate such as an n-type silicon single crystal plate.

Figure 2:
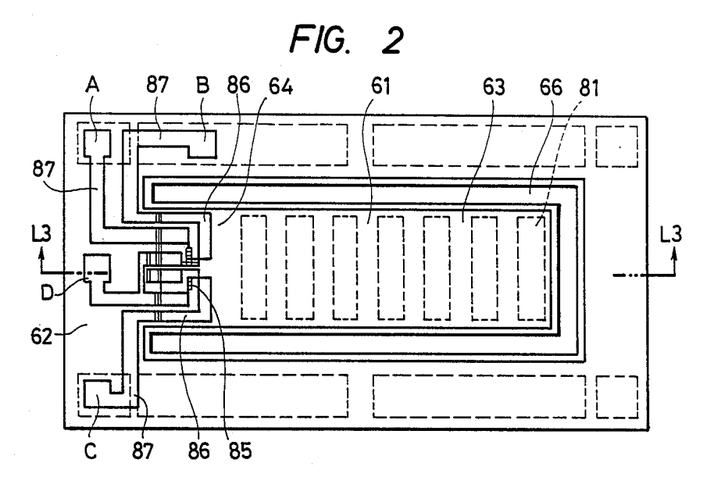
FIG. 2 is a top view of the sensor element of the accelerometer FIG. 1.
Figure 3:
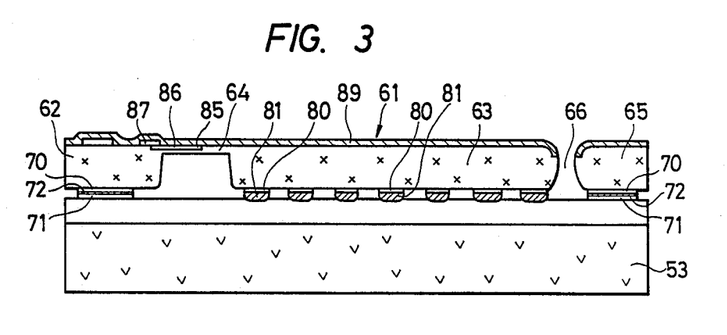
FIG. 3 is a sectional view taken along the line L3—L3 of FIG. 2.

As shown in FIGS. 2 and 3, the cantilever 61 includes a base end or support 62, a free end 63, and a thin diaphragm 64 extending between the support 62 and the free end 63. A guard 65 integrally extending from the support 62 surrounds the free end 63 to protect the latter. The guard 65 is spaced from the free end 63 and the diaphragm 64 by a gap 66. It should be noted that the guard 65 may be omitted.

A scribe alley for producing the gap 66 is created by etching both surfaces of a semiconductor starting material for the cantilever 61. For example, after the upper surface of a portion of the starting material to be scribed is subjected to etching, the lower surface of the portion is subjected to etching during the formation of the diaphragm 64.

Lower surfaces of given areas of the support 62 and the guard 65 are coated with layers 70 containing solderable metal such as nickel. The formation of the solderable layers 70 is performed by plating or vapor coating. Upper surfaces of given areas of the base 53 are correspondingly coated with layers 71 of solderable metal which oppose the solderable layers 70 on the support 62 and the guard 65. The layers 70 and 71 are bonded via layers 72 of solder. In this way, the support 62 and the guard 65 are fixed to the base 53.

Figure 4:
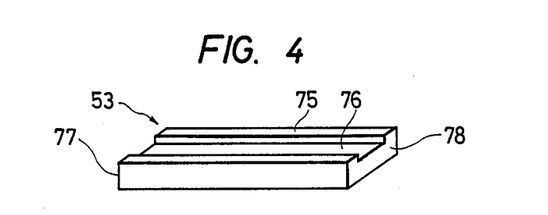
FIG. 4 is a perspective view of the base of FIGS. 1 and 3.

As best shown in FIG. 4, the base 53 is approximately in the form of a rectangular parallelepiped, having an upper surface 75 which opposes the cantilever 61. The upper surface 75 of the base 53 has a recess or groove 76 of a predetermined depth which allows displacement of the cantilever 61. The recess 76 extends between opposite edges of the upper surface 75. In other words, the recess 76 extends between opposite side surfaces 77 and 78 of the base 53. Opposite ends of the recess 76 are open at the side surfaces 77 and 78 of the base 53 respectively.

It is preferable that the base 53 is made of silicon to match thermal expansion coefficients of the base 53 and the cantilever 61.

As shown in FIG. 3, parallel solderable metal layers 80 spaced at regular intervals are formed on the lower surface of the cantilever free end 63. Solder layers 81 are bonded to the respective metal layers 80. The solder layers 81 form a mass or weight fixed to the cantilever free end 63. The mass fixed to the cantilever free end 63 increases the sensitivity of the accelerometer. As shown in FIGS. 2 and 3, the solder layers 81 are arranged in a parallel spaced manner. The spaced and parallel arrangement of the solder layers 81 prevents solder from unacceptably hanging down and also prevents unbalanced distribution of solder. It should be noted that the solderable layers 80 can be formed simultaneously with the formation of the solderable layers 70 on the support 62 and the guard 65 by the same process. In addition, the solder layers 81 can be formed simultaneously with the formation of the solder layers 72 on the support 62 and the guard 65 by the same process.

Four semiconductor strain gauges 85 are formed in or on the diaphragm 64 of the cantilever 61 by know semiconductor processing technique. For example, during the formation of the semiconductor strain gauges 85, p-type impurities consisting of suitable atom such as boron are injected into tee n-type silicon diaphragm 64 in thermal diffusion technique or ion implantation technique. The four semiconductor strain gauges 85 are electrically connected in a full bridge by wiring layers 86 and wiring members 87 formed on the diaphragm 64 and the support 62 of the cantilever 61. For example, the wiring layers 86 are formed by injecting p-type impurities into the n-type silicon diaphragm 64 at a high concentration or density. For example, the wiring members 87 are made of aluminum films formed on the support 62 by vapor coating. Ends of the wiring members 87 are provided with pads A, B, C, and D electrically connected to the terminals 56 via wires 88 (see FIG. 1) respectively.

It should be noted that the wiring layers 86 may be composed of aluminum films formed by vapor coating. The number of the strain gauges 85 may differ from four. The strain gauges 85 may be arranged in a form other than a full bridge. The strain gauges 85 may be composed of polycrystalline silicon formed on the cantilever diaphragm 64.

The upper surfaces of the cantilever 61 and the guard 65 are coated with protective layers or films 89 made of suitable material such as silicon dioxide.

When the cantilever 61 is exposed to an acceleration, the free end 63 moves relative to the support 62 so that a stress is induced in the diaphragm 64. The stress in the diaphragm 64 causes variations in the resistances of the semiconductor strain gauges 85. Accordingly, the resistances of the strain gauges 85 vary with the acceleration. The bridge circuit of the strain gauges 85 is unbalanced in accordance with the variations in the resistances of the strain gauges 85. Accordingly, the bridge circuit of the strain gauges 85 is unbalanced in accordance with the acceleration. In cases where a preset potential is applied to the bridge circuit of the strain gauges 85, the bridge circuit outputs a voltage which depends on the unbalance of the bridge circuit and thus which represents the acceleration.

Figures 5, 6, 7, 8:
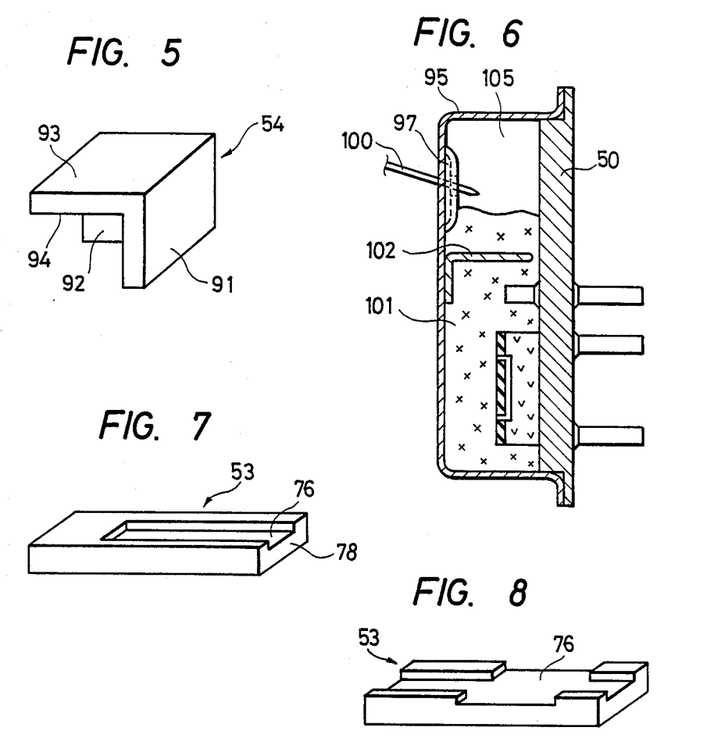
FIG. 5 is a perspective view of the stopper of FIG. 1.
FIG. 6 is a sectional view of the assembled accelerometer taken along the line L6—L6 of FIG. 1.
FIG. 7 is a perspective view of a first modified base in the first embodiment of this invention.
FIG. 8 is a perspective view of a second modified base in the first embodiment of this invention.

As shown in FIG. 5, the stopper 54 is composed of a combination of plates 91, 92, and 93 extending perpendicular to each other. The plates 91 and 92 extend perpendicular to the raised portion 51 of the stem 50. The plate 93 extends parallel to the raised portion 51, that is, parallel to the cantilever 61. The plate 93 extends from an upper edge of the plate 91 to a range directly above the distal edge of the cantilever free end 63. The lower surface 94 of the plate 93 is normally separated from the upper surface of the cantilever 61 by a predetermined gap. The stopper 54 is made of material such as Kovar.

As shown in FIG. 1, a shell or upper package member 95 in the form of a box has an open lower end and flanged edges 96 defining the open lower end. The edges 96 of the shell 95 oppose the edges 52 of the stem 50. A recess in the shell 95 is formed through a suitable process such as a pressing process. The edges 96 of the shell 95 ar sealingly welded to the edges 52 of the stem 50. For example, while the edges 52 and 96 are kept in contact by a pressure, an electric welding current is passed through the contacting surfaces of the edges 52 and 96 to sealingly weld the edges 52 and 96. In this way, the shell 95 and the stem 50 form a sealed package or casing which accommodates the base 53, the sensor element 60, and the stopper 54.

The top walls of the shell 95 has holes 97 and 98. The hole 97 allows damping liquid to be injected into the package. The hole 98 allows escape of air from the package during injection of damping liquid into the package. After the shell 95 and the stem 50 are welded, as shown in FIG. 6, an outlet needle of an injector 100 is inserted int the package via the hole 97 and a predetermined quantity of damping liquid 101 is injected into the package by the injector 100. For example, the damping liquid 101 fills 70-80% of the volume of the interior of the package. During the injection of the damping liquid 101, the hole 98 allows air to escape from the package. After the injection of the damping liquid 101 into the package is completed, the holes 97 and 98 are sealingly closed by solder. As shown in FIG. 6, a predetermined volume of air 105 remains within the package.

A partition wall 102 extending within the package is attached to the top wall of the shell 95. A gap between the partition wall 102 and the stem 100 allows movement of the damping liquid 101 between chambers divided by the partition wall 102. The partition wall 102 prevents the damping liquid 101 from being choppy.

As described previously, the area of the base 53 opposing the cantilever 61 is formed with the recess 76 of the predetermined depth. In the case where the cantilever free end 63 is displaced toward the base 53 by a shock applied to the accelerometer, when the free end 63 meets the bottom surface of the recess 76, the free end 63 is forcedly stopped. Accordingly, the depth of the recess 76 determines the maximal downward displacement of the cantilever free end 63. The depth of the recess 76 is chosen to prevent excessive displacement of the cantilever 61 which would damage the cantilever 61.

As described previously, the recess 76 extends between the side surfaces 77 and 78 of the base 53 and opens at the side surfaces 77 and 78. Accordingly, during displacement of the cantilever 61 toward the base 53, the damping liquid 101 freely escapes from the recess 76 via open ends of the recess 76 located at the side surfaces 77 and 78 of the base 53. The free escape of the damping liquid 101 from the recess 76 ensures that effective viscosity of the damping liquid 101 fixing resistance to movement of the cantilever 61 is essentially determined by only the intrinsic damping factor of the damping liquid 101. In this way, the cantilever 61 is prevented from undergoing excessive damping effect so that excellent frequency characteristics of the accelerometer are available. Specifically, the resonance of the cantilever 61 is reliably prevented from adversely affecting characteristics of the accelerometer, and a wide frequency range where the accelerometer operates acceptably is obtained.

The stopper 54 limits upward displacement of the cantilever 61 and prevents damage to the cantilever 61 which would be caused by excessive displacement of the cantilever 61. The upper plate 93 of the stopper 54 extends above only the distal edge of the cantilever free end 63. In other words, a major part of the cantilever 61 except the distal edge of the free end 63 is uncovered from the stopper 54. Accordingly, the stopper 54 does not increase effective viscosity of the damping liquid 101 so that acceptable frequency characteristics of the accelerometer are ensured.

FIG. 7 shows a first modified base 53 having an upper surface formed with a recess 76, which extends to and opens at one side surface 78 of the base 53.

FIG. 8 shows a second modified base 53 having an upper surface formed with a recess 76, which has a cross shape and which extends to and opens at four side surfaces of the base 53.

Figure 9:
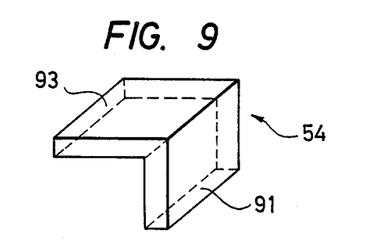
FIG. 9 is a perspective view of a modified stopper in the first of this invention.

FIG. 9 shows a modified stopper 54 which is composed of a hook-shaped combination of plates 91 and 93 extending perpendicular and parallel to the raised portion 51 of the step 50 (see FIG. 1) respectively.

The metal layers 80 and the solder layers 81 will be described in more detail hereinafter with reference to FIGS. 2, 3, and 10. It is preferable that the metal layers 80 and the solder layers 81 are formed on a wafer of a single crystal of silicon to increase the productivity. It should be noted that in FIG. 10 and the related description, the silicon wafer is illustrated and explained as the cantilever free end 63 for a better understanding.

During fabrication of the metal layers 80 and the solder layers 81, a film of resist defining metal layer patterns is formed on the surface of the cantilever free end 63 by use of a glass mask, and then titanium, nickel, and gold are sequentially deposited on the surface of the cantilever free end 63 by vapor coating to form the metal layers 80. In this process, titanium may be replaced by chromium. After the metal layers 80 are completed, the resist film is removed.

Figure 10:
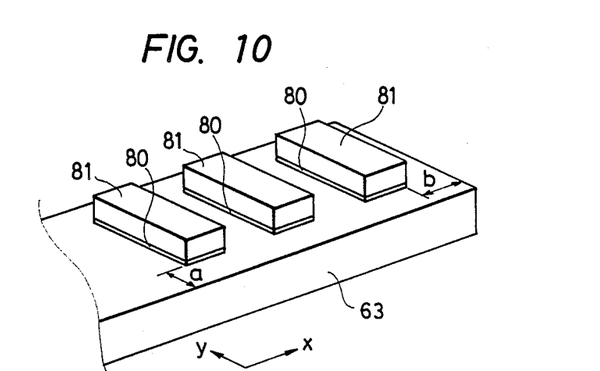
FIG. 10 is a perspective view of the cantilever free end of FIGS. 1—3.

As shown in FIGS. 2, 3, and 10, the metal layers 80 have identical rectangular shapes, extending parallel to each other. The metal layers 80 are spaced at regular intervals along the longitudinal direction "x" of the cantilever free end 63. The longitudinal axis of each metal layer 80 extends perpendicular to the longitudinal direction "x" of the cantilever free end 63 and thus parallel to the lateral direction "y" of the cantilever free end 63. The lateral edges of each metal layer extend inward of the longitudinal edges of the cantilever free end 63 by a distance "a". The outermost metal layer 80 extends inward of the distal edge of the cantilever free end 63 by a distance "b".

It should be noted that the metal layers 80 may be formed in other ways. In one example, after the entire region of the surface of the cantilever free end 63 is coated with a metal layer, part of the metal layer is removed to form the metal layers 80 of the predetermined patterns.

The solder layers 81 are formed on the metal layers 80. For example, the solder layer 81 are printed on the metal layers 80 by use of a stainless mask. Then, the solder layers 81 are subjected to a reflowing process.

As described previously, the solder layers 81 form a mass or weight fixed to the cantilever free end 63. The addition of the mass to the cantilever free end 63 is to increase the sensitivity of the accelerometer. The identical shapes of the metal layers 80 ensure that the weights or quantities of the respective solder layers 81 are essentially equal. Accordingly, tee regularly spaced arrangement of the metal layers 80 along the longitudinal direction "x" of the cantilever free end 63 prevents unacceptably unbalanced distribution of the mass along the longitudinal direction "x" of the cantilever free end 63 which would lower the accuracy of the accelerometer. In addition, the divided arrangement of the solder layers 81 prevents solder from unacceptably hanging down. Since the metal layers 80 extend inward of the edges of the cantilever free end 63, solder is reliably prevented from hanging or falling onto the side surfaces of the cantilever free end 63.

Since the nickel films in the metal layers 80 generally have great stresses, the nickel films would tend to cause variations in the initial value of output of the accelerometer. In the embodiment of this invention, the divided arrangement of the metal layers 80 reduces the total area of the nickel films and the regions between the metal layers 80 buffer the stresses, so that the adverse influence of the stresses upon the accelerometer is reduced.

It should be noted that the solder layers 81 may be formed on the surface of the cantilever 61 opposite the surface of the cantilever 61 having the recess defining the diaphragm 64.

Figure 11:
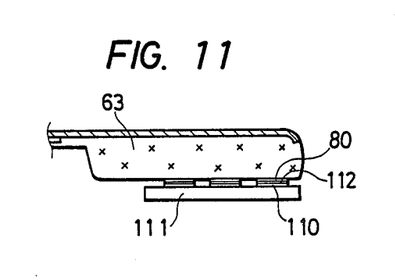
FIG. 11 is a sectional view of a cantilever free end provided with a mass of a first modified structure in the first embodiment of this invention.
Figure 12:
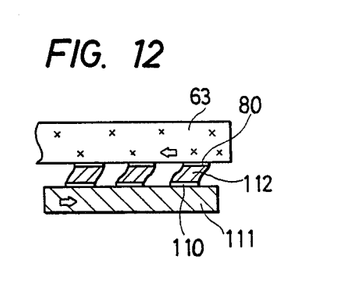
FIG. 12 is a diagram of a portion of the cantilever free end of FIG. 11.

FIGS. 11 and 12 show a first modified structure of a mass fixed to the cantilever free end 63. In the modified structure of FIGS. 11 and 12, solderable metal layers 110 are formed on a surface of a mass member 111 in a way similar to the way of the formation of the metal layers 80 on the cantilever free end 63. The metal layers 110 are arranged in correspondence with the metal layers 80. Solder layers are formed on the metal layers 110 in a way similar to the way of the formation of the solder layers on the metal layers 80. While the solder layers on the metal layers 80 and 110 are held in contact, the solder layers are subjected to a reflowing process and are thereby jointed to bond the mass member 111 and the cantilever free end 63. After the reflowing process, the mass member 111 and the cantilever free end 63 are bonded by jointed solder layers 112 sandwiched between the metal layers 80 and 110.

It is now assumed that the initial position of the mass member 111 relative to the cantilever free end 63 deviates from a normal position. During the reflowing process, as show in FIG. 12, such a deviation of the initial position of the mass member 111 from the normal position can be corrected by self-alignment effect which results from surface tensions of the jointed solder layers 112. Accordingly, the final position of the mass member 111 relative to the cantilever free end 63 can be accurately coincident with the normal position.

The mass member 111 is made of material such as Kovar or glass. In the case where the mass member 111 is made of solderable material such as Kovar, the metal layers 110 can be omitted.

Figure 13:
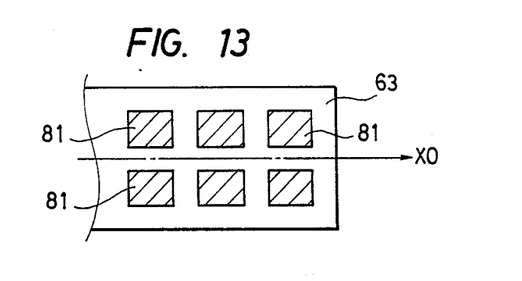
FIG. 13 is a plan view of a cantilever free end provided with a mass of a second modified structure in the first embodiment of this invention.

FIG. 13 shows a second modified structure of a mass fixed to the cantilever free end 63. In the modified structure of FIG. 13, the solder layers 81 are arranged in a matrix. Specifically, the solder layers 81 have identical rectangular shapes smaller than the shapes of th solder layers of FIGS. 2 and 10. The solder layers 81 are separated into two groups which extend at both sides of the central longitudinal axis x0 of the cantilever free end 63 respectively. In each group, the solder layers 81 are spaced at regular intervals. The solder layers 81 in the first group and the solder layers 81 in the second group are symmetrical with respect to the central longitudinal axis x0 of the cantilever free end 63. This symmetrical matrix arrangement of the solder layers 81 prevents unacceptably unbalanced distribution of the mass fixed to the cantilever free end 63.

Figure 14:
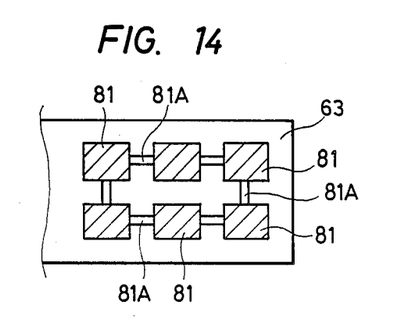
FIG. 14 is a plan view of a cantilever free end provided with a mass of a third modified structure in the first embodiment of this invention.

FIG. 14 shows a third modified structure of a mass fixed to the cantilever free end 63. This modified structure is similar to the structure of FIG. 13 except for the following design change. In the modified structure of FIG. 14, the solder layers 81 are connected in a loop via narrow solder layers 81A. The modified structure of FIG. 14 has an advantage similar to the advantage of the structure of FIG. 13.

It should be noted that the mass fixed to the cantilever free end 63 may be of other structures symmetrical with respect to the central longitudinal axis of the cantilever free end.

DESCRIPTION OF THE SECOND PREFERRED EMBODIMENT

Figure 15:
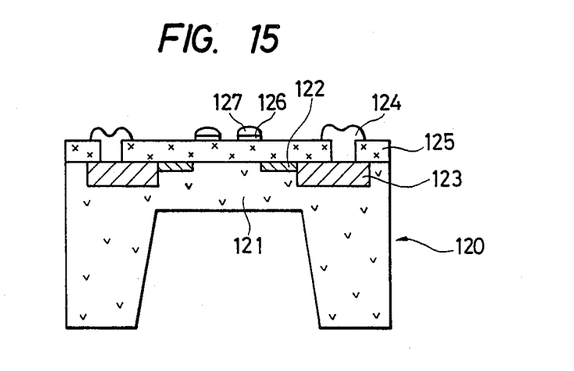
FIG. 15 is a sectional view of a semiconductor accelerometer according to a second embodiment of this invention.

FIG. 15 shows a semiconductor accelerometer according to a second embodiment of this invention which includes a beam whose opposite ends are fixed. As shown in FIG. 15, the beam includes a silicon substrate 120 having a diaphragm 121. Semiconductor strain gauges 122 are formed in the diaphragm 121. The semiconductor strain gauges 122 are electrically connected to terminals 124 via wiring layers 123 which are formed in the silicon substrate 120 by high-density diffusion of p-type impurities. The upper surface of the silicon substrate 120 is coated with an insulating layer 125. Solder layers 127 are fixed via solderable metal layers 126 on the areas of the insulating layer 125 which extend directly above the diaphragm 121 but which reside outside the regions directly above the semiconductor strain gauges 122. The solder layers 127 form a mass or weight fixed to the diaphragm 121. The configuration of the solder layers 227 is of a point symmetry with respect to the center of the diaphragm 121.

DESCRIPTION OF THE THIRD PREFERRED EMBODIMENT

Figure 16:
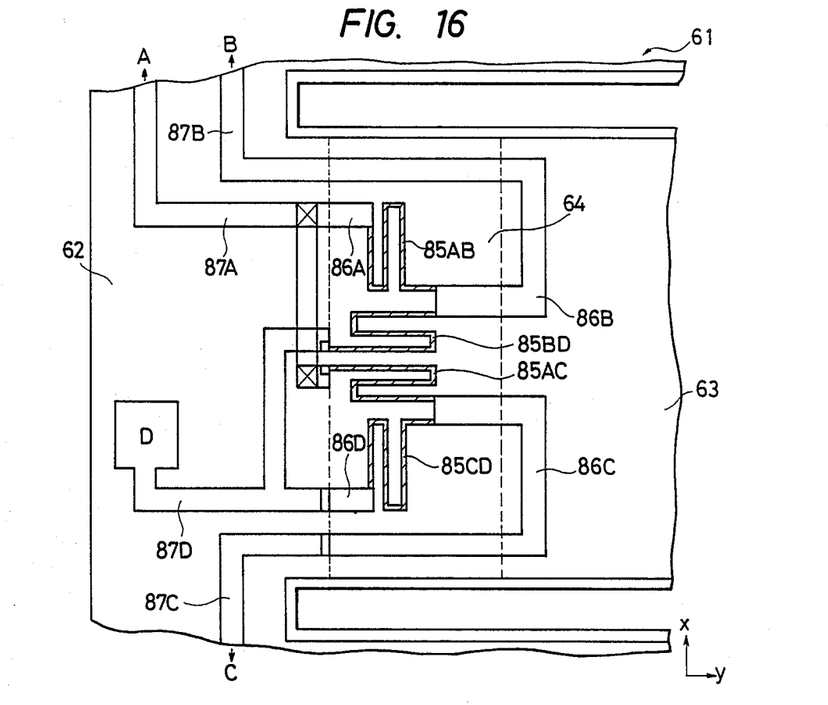
FIG. 16 is a plan view of a portion of a cantilever in a semiconductor accelerometer according to a third embodiment of this invention.
Figure 17:
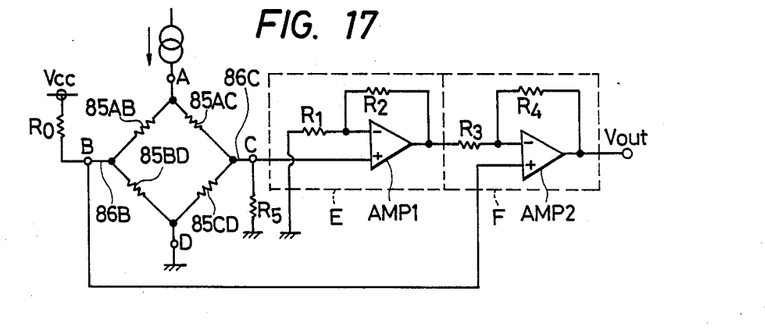
FIG. 17 is a schematic diagram of the semiconductor accelerometer of FIG. 16 and an electrical circuit.

FIGS. 16 and 17 show a semiconductor accelerometer according to a third embodiment of this invention, which is similar to the embodiment of FIGS. 1-6 except for design changes described hereinafter.

As shown in FIG. 16, semiconductor strain gauges 85AB, 85BD, 85AC, and 85CD formed in the cantilever diaphragm 64 extend symmetrically. Specifically, the strain gauges 85AB and 85CD are symmetrical with respect to the central longitudinal axis of the cantilever 61. The strain gauges 85BD and 85AC are symmetrical with respect to the central longitudinal axis of the cantilever 61. One end of the strain gauge 85AB is connected to one end of the strain gauge 85BD via a wiring layer 86B. The other end of the strain gauge 85AB is connected to one end of the strain gauge 85AC via a wiring layer 86A and a wiring member 87A. The other end of the strain gauge 85BD is connected to one end of the strain gauge 85CD via a wiring member 87D and a wiring layer 86D. The other end of the strain gauge 85AC is connected to the other end of the strain gauge 85CD via a wiring layer 86C. The wiring layers 86A-86D lead to the pads A-D (see FIG. 2) via the wiring members 87A-87D respectively.

The wiring layers 86B and 86C extend from the cantilever diaphragm 64 into the cantilever free end 63, returning to the cantilever diaphragm 64 and extending into the cantilever support 62 via the cantilever diaphragm 64. Accordingly, in cases where the cantilever diaphragm 64 breaks along a transverse line, the wiring layers 86B and 86C snap. The breaks of the wiring layers 86B and 86C cause abnormal output of the strain gauge bridge circuit.

As shown in FIG. 17, a preset constant potential Vcc is applied to the pad or point B via a resistor R0. The pad or point D is grounded. The pad or point C is grounded via a resistor R5 having a resistance equal to the resistance of the resistor R0. A constant current passes through the pad or point A.

A combination of an operational amplifier AMP1 and resistors R1 and R2 constitutes a non-inverting amplifier E. A combination of an operational amplifier AMP2 and resistors R3 and R4 constitutes a non-inverting amplifier F. A first input terminal of the amplifier E is connected to the point C. A second input terminal of the amplifier E is grounded. A first input terminal of the amplifier F is connected to the point B. A second input terminal of the amplifier F is connected to an output terminal of the amplifier E. The resistance of the resistor R1 is equal to the resistance of the resistor R4. The resistance of the resistor R2 is equal to the resistance of the resistor R3. The resistances of the resistors R0 and R5 are much greater than the resistances of the strain gauges 85AB, 85AC, 85BD, and 85CD.

When the strain gauge bridge circuit and the electrical connections to the bridge circuit are normal, a voltage output Vout from the amplifier F is given by the following equation.

$$V_{out} = (VB - VC) \cdot (r1 + r2)/r2$$

where the characters VB and VC represent potentials at the points B and C respectively, and the characters r1 and r2 represent the resistances of the resistors R1 and R2 respectively. It should be noted that the resistances of the resistors R3 and R4 are equal to the resistances of the resistors R2 and R1 respectively.

In cases where the wiring layers 86B and 86C break due t a damage to the cantilever diaphragm 64, the potential VB becomes equal to the preset constant potential Vcc and the potential VC drops to the ground potential so that the voltage output Vout considerably rises above its normal value. Accordingly, a damage to the cantilever diaphragm 64 can be detected by sensing a considerable rise in the voltage output Vout.

Figure 18:
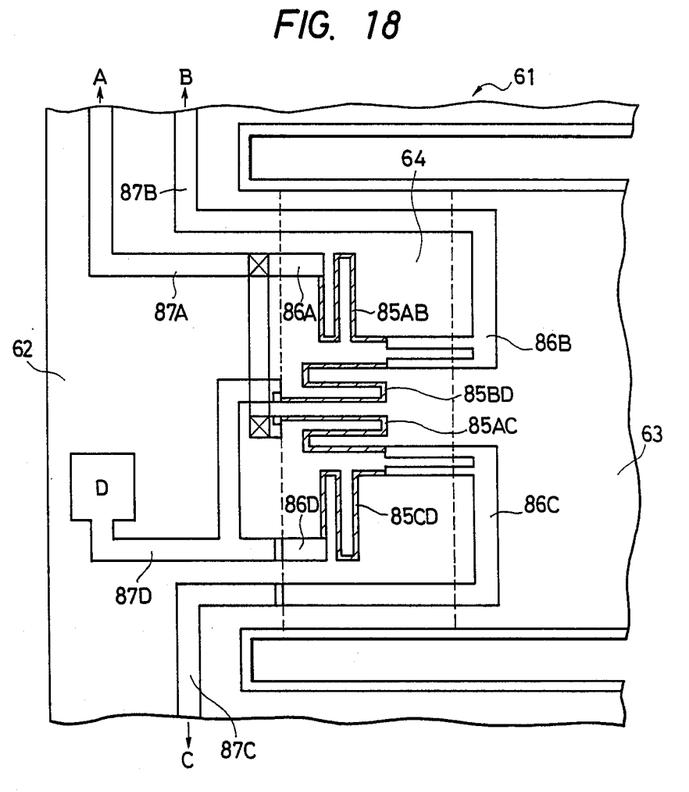
FIG. 18 is a plan view of a modified cantilever in the third embodiment of this invention.

FIG. 18 shows modified wiring layers 86B and 86C whose ends fork into elongated segments. The two elongated segments of the wiring layer 86B extend from the respective strain gauges 85AB and 85BD into the cantilever free end 3. The two elongated segments of the wiring layer 86C extend from the respective strain gauges 85AC and 85CD into the cantilever free end 63. This modified design prevents an electric current from flowing between the points A and D when the cantilever diaphragm 64 breaks.

DESCRIPTION OF THE FOURTH PREFERRED EMBODIMENT

Figure 19:
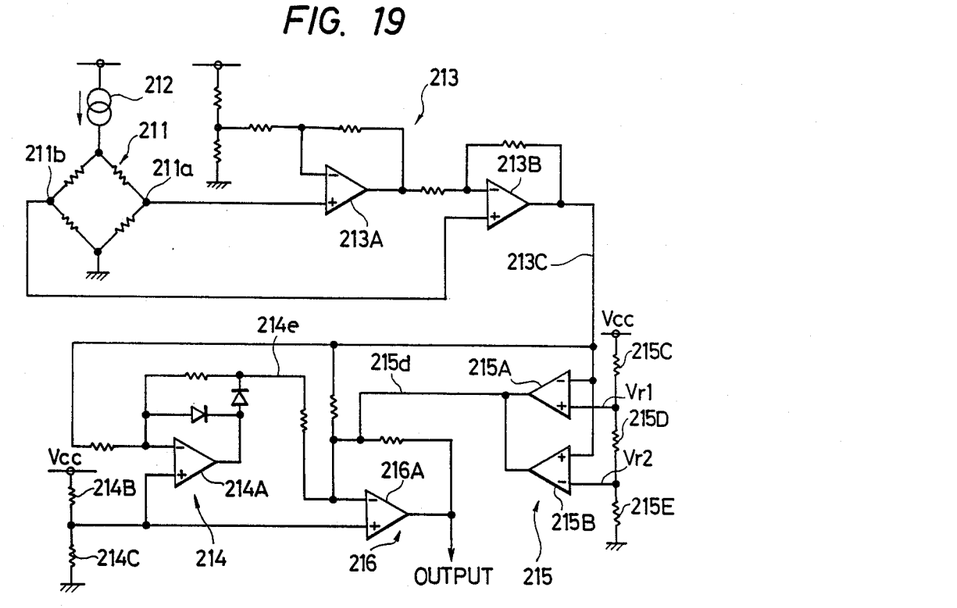
FIG. 19 is a schematic diagram of a semiconductor accelerometer and an electrical circuit according to a fourth embodiment of this invention.

With reference to FIG. 19 showing a fourth embodiment of this invention, an accelerometer 211 including a full bridge of semiconductor strain gauges is similar to the accelerometer in the embodiment of FIGS. 16 and 17. A current regulating circuit 212 supplies a constant current to the bridge of the strain gauges. A potential between output terminals 212a and 212b of the strain gauge bridge normally represents acceleration applied to the accelerometer 211. The acceleration signal is magnified by an instrument differential amplifier 213 including operational amplifiers 213A and 213B. The differential amplifier 213 is essentially similar to tee combination of the amplifiers E and F of FIG. 17.

Figure 20:
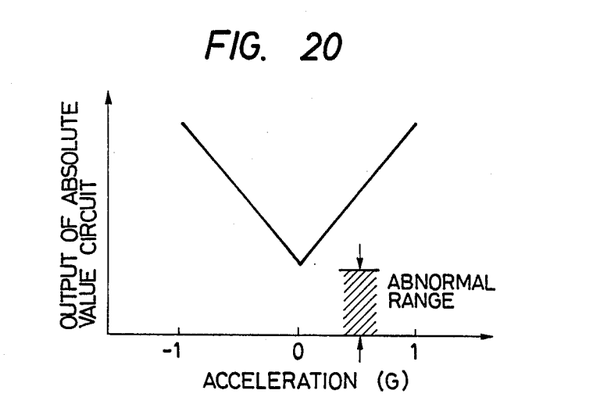
FIG. 20 is a diagram showing the relationship between acceleration and output of the absolute value circuit of FIG. 19.

The amplified acceleration signal 213c is applied to an absolute value circuit 214 including an operational amplifier 214A. The inverting input terminal of the operational amplifier 214A is subjected to the acceleration signal 213c. The non-inverting input terminal of the operational amplifier 214A is subjected to a reference potential generated by a combination of resistors 214B and 214C. The reference potential is chosen to correspond to an acceleration of 0 G so that the output signal 214e from the absolute value circuit 214 represents the absolute value of the acceleration applied to the accelerometer 211 as shown in FIG. 20. The absolute acceleration signal 214e is magnified by an amplifier 216 including an operational amplifier 216A.

A malfunction detector 215 includes comparators 215A and 215B. The inverting input terminal of the comparator 215A is subjected to the acceleration signal 213c. The non-inverting input terminal of the comparator 215A is subjected to a reference potential Vr1 generated by a combination of resistors 215C, 215D, and 215E. The inverting input terminal of the comparator 215B is subjected to a reference potential Vr2 generated by the combination of the resistors 215C-215E. The reference potential Vr2 is lower than the reference potential Vr1. The non-inverting input terminal of the comparator 215B is subjected to the acceleration signal 213c. Output signals from the comparators 215A and 215B are applied in common to an input terminal of the amplifier 216. An output portion of each of the comparators 215A and 215B is composed of an open collector of an NPN transistor. When the voltage of the acceleration signal 213c resides between the reference potentials Vr1 and Vr2, both outputs from the comparators 215A and 215B are in high level states so that an output signal 215d from the malfunction detector 215 is also in a high level state. When the voltage of the acceleration signal 213c is higher than the reference potential Vr1 or lower than the reference potential Vr2, one of the outputs from the comparators 215A and 215B is in a low level state so that the output 215d signal from the malfunction detector 215 is also in a low level state. The reference potentials Vr1 and Vr2 are chosen so that the range between the potentials Vr1 and Vr2 corresponds to normal conditions of the accelerometer 211 and that the ranges higher than the potential Vr1 and lower than the potential Vr2 correspond to abnormal conditions of the accelerometer 211.

When a potential at the output terminal 211a of the strain gauge bridge drops due to a damage to the accelerometer 211, the voltage of the acceleration signal 213c exceeds the reference potential Vr1 so that the output signal 215d from the malfunction detector 215 assumes the lo level state. When the potential at the output terminal 211a of the strain gauge bridge rises abnormally due to a malfunction of the accelerometer 211, the voltage of the acceleration signal 213c drops below the reference potential Vr2 so that the output signal 215d from the malfunction detector 215 assumes the low level state.

DESCRIPTION OF ACCELEROMETER ASSEMBLY

A semiconductor accelerometer of this invention is assembled in various ways. One example of accelerometer assembly will be described hereinafter.

Figure 21:
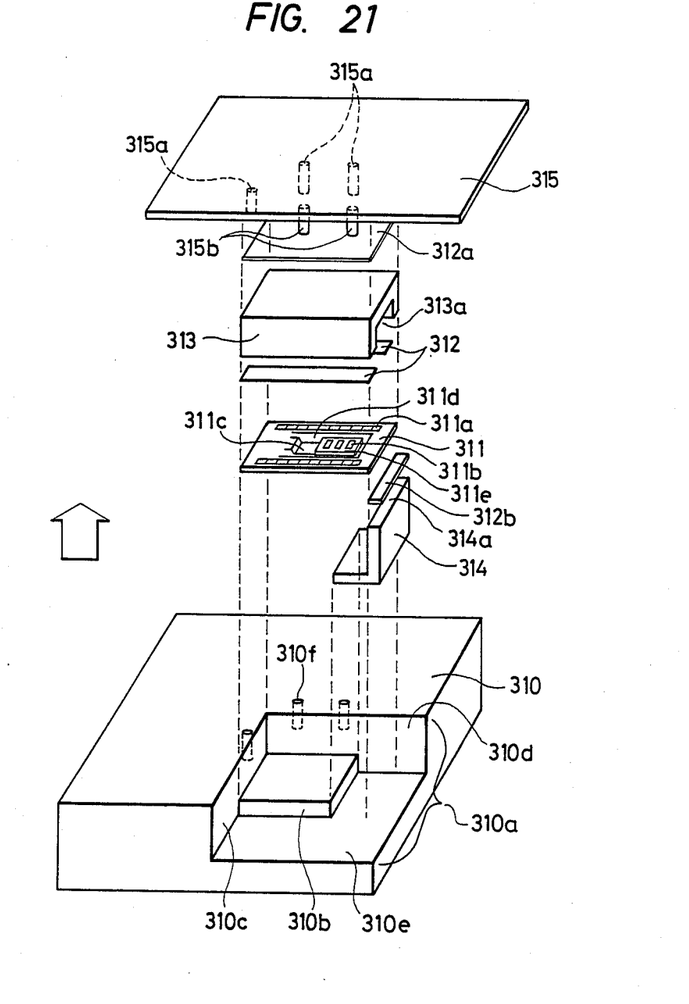
FIG. 21 is a perspective view of a semiconductor accelerometer sensor chip, a jig, and parts.

As shown in FIG. 21, a jig 310 has a cut 310a in which a small base 310b is formed. The small base 310b contacts side walls 310c and 310d defining the cut 310a. An upper surface of the small base 310b extends parallel to an upper surface of the jig 310.

A sensor chip 311 of a semiconductor accelerometer includes a cantilever defined by a groove 311d. The cantilever has a diaphragm 311c and a free end 311e. The groove 311d and the diaphragm 311c are formed by an etching process. The free end 311e is provided with rectangular solder layers 311b constituting a mass. Solderable metal layers 311a are formed on longitudinal edges of the sensor chip 311. For example, the metal layers 311a are composed of films of nickel and gold formed by vapor coating.

The sensor chip 311 is placed on the upper surface of the small base 310b in such a manner that the metal layers 311a face upward and that side surfaces of the sensor chip 311 contact the side walls 310c and 310d. Solder foils 312 are placed on the metal layers 311a.

A base 313 has a recess 313a extending between opposite end surfaces. The base 313 serves to limit upward displacement of the cantilever free end 311e. The base 313 is made of material having a thermal expansion coefficient similar to the thermal expansion coefficient of the material forming the sensor chip 311. In the case where the sensor chip 311 is made of silicon, the base 313 is also made of silicon. The surface of the base 313 having the recess 313a is placed on the solder foils 312 and is provided with solderable metal layers similar to the metal layers 311a. Side surfaces of the base 313 contact the side walls 310c and 310d. A solder foil 312a is placed over an upper surface of the base 313.

An L-shaped stopper 314 serves to limit downward displacement of the cantilever free end 311e. The stopper 14 is placed on a lower wall 310e of the jig 310 defining the cut 310a. When the stopper 314 is placed in position, a lower portion of the stopper 314 contacts the small base 310b. The stopper 314 is made of metal such as Kovar. A solderable metal layer 314a is formed on an upper surface of the stopper 314. For example, the metal layer 314a is composed of films of nickel and gold formed by a plating process. A solder foil 312b is placed on the metal layer 314a.

A base plate 315 serves to carry the base 313. In the case where the semiconductor accelerometer is disposed within a package including a combination of a metal cap and a metal base, the base plate 315 corresponds to the metal base. Poles 315a attached to the base plate 315 serve to fix the base plate 315. Specifically, when the poles 315a are inserted into respective holes 310f in the jig 310, the base plate 315 is fixed in position. Poles 315b attached to the base plate 315 serve to fix the sensor chip 311. The areas of the surface of the base plate 315 opposing the base 313 and the stopper 314 are provided with solderable metal layers.

After the parts are placed in positions along directions as viewed in FIG. 21, the jig 310 is inverted through 180°. When the jig 310 is inverted, the sensor chip 311, the base 313, and the base plate 315 are subjected to suitable pressures by their own weights. Accordingly, the parts are prevented from undergoing excessive pressure which could cause damages. The inverted jig 310 is heated and the solders are exposed to a reflowing process allows the sensor chip 311, the base 313, the base plate 315, and the stopper 314 to be connected. In this way, the parts are soldered at the same time so that assembly of the accelerometer is simple. Exposure of solders to a single reflowing process ensures reliable connections between the parts.

It should be noted that the step of inverting the jig 310 may be omitted. The solders may be replaced by adhesives made of suitable material such as resin. The solder layers 311b on the cantilever free end 311e may be replaced by a mass made of Kovar or glass fixed to the cantilever free end 311e with solder or adhesive.

DESCRIPTION OF THE FIFTH PREFERRED EMBODIMENT

In general, the semiconductor accelerometer of FIGS. 1-6 has frequency characteristics such that the output level of the accelerometer remains essentially flat below a cut-off frequency fc and decreases rapidly above the cut-off frequency fc. Accordingly the accelerometer is usable in a frequency range below the cut-off frequency fc.

A fifth embodiment of this invention is similar to the embodiment of FIGS. 1-6 except for specific settings described hereinafter. The fifth embodiment will be described with reference to FIGS. 22 and 23.

Figure 22:
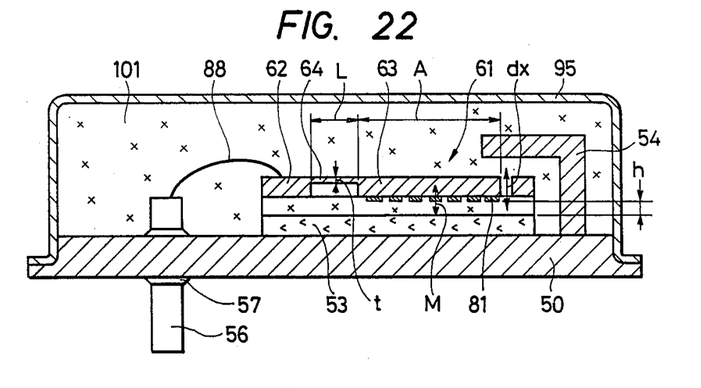
FIG. 22 is a sectional view of semiconductor accelerometer according to a fifth embodiment of this invention.

The following description is made with respect to cases where an acceleration to be measured is supplied only to the base 53.

Figure 23:
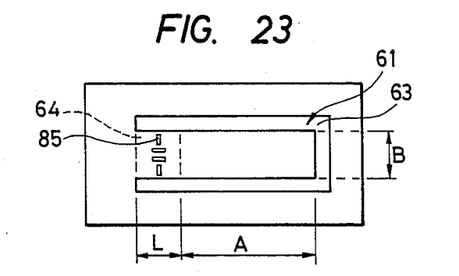
FIG. 23 is a top view of the cantilever of FIG. 22.

According to experiments, it was found that the cut-off frequency fc is expressed as follows.

$$fc = K1/[DSdx(1 + K2dx/h)]$$

$$= fc0/[1 + (k2dx/h)]$$

where the characters k1 and k2 denote constants; the character D denotes the viscosity of the damping liquid; the character S denotes the area of th cantilever free end 63 which equals the length A multiplied by the width B (see FIGS. 22 and 23); the character dx denotes a displacement of the cantilever free end 63 with respect to an acceleration of 1 G (see FIG. 22); the character h denotes the normal distance between the bottom surface of the recess 76 and th weights or solder layers 81 (see FIG. 22); and the character fc0 denotes a cut-off frequency defined in a free area in the damping liquid without a structure limiting displacement of the cantilever free end 63.

The constants k1 and k2 can be determined experimentally. In the case of a general small semiconductor accelerometer where the area S is in the range of 2-20 mm$^2$; the displacement dx is in the range of 0.02-10 μm; and the viscosity D is in the range of 10-500 cp, the constant k2 approximately equals 200.

Figure 24:
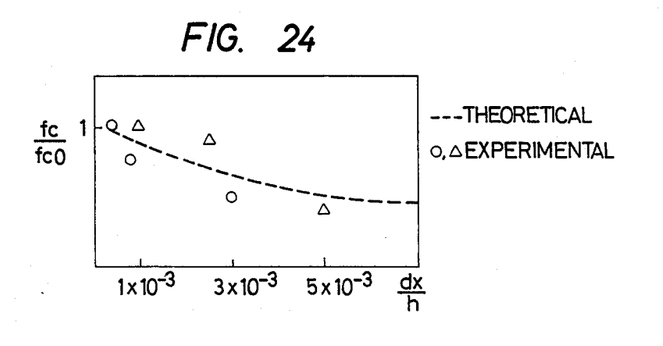
FIG. 24 is a graph showing the theoretical and experimental relationships between the value "dx/h" and the value "fc/fc0" in the semiconductor accelerometers of FIGS. 22 and 23.

FIG. 24 shows the theoretical and experimental relationship between the value 37 dx/h" and the value "fc/fcO". In FIG. 24: the broken line denotes the relationship obtained theoretically from the previous equations of fc; the circles denote the relationship obtained experimentally with respect to a first sample of the semiconductor accelerometer; and the triangles denote the relationship obtained experimentally with respect to a second sample of the semiconductor accelerometer. In the first sample: the cut-off frequency fcO equals 30 Hz; the area S equals 9.0 mm$^2$; and the displacement dx equals 2×10$^3$ mm. In the second sample: the cut-off frequency fcO equals 400 Hz; the area equals 3.6 mm$^2$; and the displacement dx equals 0.3×10$^{-3}$ mm. As understood from FIG. 24, the experimental relationship agrees with the theoretical relationship.

The previous equations of fc is rewritten as follows.

$$dx/h = (fcO - fc)/(k2fc) = C$$

As understood from this equation, when the value "dx/h" is chosen to be equal to or smaller than the value C, that is, when the distance h is chosen to be equal to or greater than the value "dx/C", a desired frequency range of acceleration to be measured can be set within a usable frequency range determined by the cut-off frequency fc.

The maximal allowable acceleration Gmax, that is, the upper limit of a range of acceleration in which the cantilever 61 operates without damage, is given as follows.

$$Gmax = Bt^2Q/[3M(L+A)]$$

where the character A denotes the length of the cantilever free end 63 (see FIGS. 22 and 23); the character B denotes the width of the cantilever free end 63 (see FIG. 23); the character L denotes the length of the cantilever diaphragm 64 (see FIGS. 22 and 23); the character t denotes the thickness of the cantilever diaphragm 64 (see FIG. 22); the character M denotes the total weight of the cantilever free end 63 including the solder layers 81; and the character Q denotes the breaking stress of silicon which equals 2×10$^9$ dyn/cm$^2$.

When the accelerometer is subjected to the maximal allowable acceleration Gmax, the displacement hmax of the distal edge of the cantilever 61 is given as follows.

$$hmax = MGmaxgA](1-A)L^2 + A^2 + (15AL/4)]/(6EI)$$

where the character g denotes the acceleration of gravity; the character E denotes the Young's modulus; and the character I denotes the second moment of area which equals Bt$^3$/12. Accordingly, when the distance h is chosen to be smaller than the displacement hmax, damage to the cantilever 61 can be prevented.

What is claimed is:

1. A semiconductor accelerometer comprising:
 (a) a package including damping liquid therein which has a viscosity of 10-500 cp;
 (b) a base fixedly disposed within the package;
 (c) a cantilever disposed within the package and supported on the base, the cantilever having a movable free end with an area between 2-20 mm$^2$ and a deformable diaphragm;
 (d) a semiconductor strain gauge associated with the diaphragm and deforming in accordance with deformation of the diaphragm; and
 (e) wall disposed within the package, the wall being spaced from the cantilever free end by a predetermined distance and allowing displacement of the cantilever free end in a range corresponding to the predetermined distance;
 wherein the predetermined distance is equal to or greater than a value h given by the following equation:

$$h = dxKfc/(fc0 - fc)$$

where the character dx denotes a displacement of the cantilever free end with respect to an acceleration of 1 G and is between 0.02 and 10 μm; the character fc denotes a desired cut-off frequency; the character fc0 denotes a cut-off frequency in a free area in the damping liquid without the wall; and the character K denotes a constant of value substantially 200.

2. The semiconductor accelerometer of claim wherein the distance h is smaller than a displacement hmax which is given as follows:

$$hmax = MGmaxgA\{(1-A)L^2 + A^2 + (15AL/4)\}/(6EI)$$

where the character M denotes a total weight of the cantilever free end; the character Gmax denotes a maximal allowable acceleration in which the cantilever can operate without damage; the character g denotes an acceleration of gravity; the character A denotes a length of the cantilever free end; the character L denotes a length of the cantilever diaphragm; the character E denotes Young's modulus of the cantilever; the character I denotes a second moment of area which equals Bt$^3$/12 where the character B denotes a width of the cantilever free end and the character t denotes a thickness of the cantilever diaphragm.

3. A semiconductor accelerometer comprising:
 (a) a package including damping liquid therein;
 (b) a base fixedly disposed within the package;
 (c) a semiconductor plate disposed within the package and supported on the base, the semiconductor plate having a movable free end and a deformable diaphragm;
 (d) a semiconductor strain gauge operatively associated with the diaphragm and deforming in accordance with deformation of the diaphragm; and
 (e) a plurality of separate solder layers fixed to a surface of the semiconductor plate free end which faces the base, the solder layers being in an arrangement symmetrical with respect to a central longitudinal axis of the semiconductor plate free end.

4. The semiconductor accelerometer of claim 3 wherein the solder layers are located inward of edges of the semiconductor plate free end to be prevented from falling onto side surfaces of the cantilever free end during formation of the solder layers.

5. The semiconductor accelerometer of claim 3 further comprising a plurality of solderable layers corresponding to the respective solder layers and fixed to the semiconductor plate free end, the solder layers being fixed to the respective solderable layers.

6. The semiconductor accelerometer of claim 3 further comprising first solderable layers corresponding to the respective solder layers and being fixed to the semiconductor plate free end, a weight member, second solderable layers corresponding to the respective solder layers and fixed to the weight member, the solder layers being connected between the first solderable layers and the second solderable layers, wherein an arrangement of the first solderable layers, the solder layers, and the second solderable layers enables the weight member to undergo a self-alignment effect during a solder reflowing process.

* * * * *